(12) United States Patent
Grunbach et al.

(10) Patent No.: US 7,877,164 B2
(45) Date of Patent: Jan. 25, 2011

(54) METHOD AND SYSTEM FOR ASSEMBLING PALLETS FOR STOCK ORDERS

(75) Inventors: Adrian Alexander Grunbach, Pennant Hills (AU); Max Francis Ferrigni, El Segundo, CA (US)

(73) Assignee: Dematic Pty, Ltd., Belrose, New South Wales (AU)

( * ) Notice: Subject to any disclaimer, the term of this patent is extended or adjusted under 35 U.S.C. 154(b) by 767 days.

(21) Appl. No.: 11/881,158

(22) Filed: Jul. 25, 2007

(65) Prior Publication Data

US 2008/0199297 A1    Aug. 21, 2008

(30) Foreign Application Priority Data

Feb. 16, 2007    (AU)    ............................. 2007900839

(51) Int. Cl.
*G06F 7/00*    (2006.01)
(52) U.S. Cl. ..................... 700/217; 414/404; 414/799
(58) Field of Classification Search ................. 700/217, 700/213, 216, 214; 414/404, 413.05, 266, 414/799, 331.05, 800, 801, 810
See application file for complete search history.

(56) References Cited

U.S. PATENT DOCUMENTS

| | | | | |
|---|---|---|---|---|
| 3,836,018 | A * | 9/1974 | Dawson et al. ............ | 414/790.9 |
| 5,135,351 | A * | 8/1992 | Rathert ...................... | 414/789.5 |
| 5,631,028 | A * | 5/1997 | Mizokawa et al. ......... | 425/28.1 |
| 5,632,590 | A * | 5/1997 | Pearson et al. .............. | 414/404 |
| 5,903,464 | A * | 5/1999 | Stingel et al. ............... | 700/215 |
| 6,602,037 | B2 | 8/2003 | Winkler | |
| 6,851,912 | B1 * | 2/2005 | Zahn ........................... | 414/404 |
| 7,070,004 | B2 * | 7/2006 | Hendriks et al. ............... | 172/20 |
| 7,708,517 | B2 | 5/2010 | Nakamura et al. | |
| 2003/0149644 | A1 | 8/2003 | Stingel, III et al. | |
| 2007/0116550 | A1 * | 5/2007 | Nakamura et al. .......... | 414/797 |
| 2007/0248448 | A1 * | 10/2007 | Starz .......................... | 414/788 |
| 2007/0280814 | A1 * | 12/2007 | Morency et al. ............ | 414/788 |
| 2010/0150689 | A1 | 6/2010 | Berry et al. | |

FOREIGN PATENT DOCUMENTS

WO    2008/098312 A1    8/2008

OTHER PUBLICATIONS

International Search Report of the International Searching Authority from related Patent Cooperation Treaty (PCT) Application No. PCT/AU2008/000207, mailed Mar. 25, 2008.
International Preliminary Report on Patentability from related Patent Cooperation Treaty (PCT) Application No. PCT/AU2008/000207 mailed May 27, 2009.

* cited by examiner

*Primary Examiner*—Gene Crawford
*Assistant Examiner*—Ramya Prakasam
(74) *Attorney, Agent, or Firm*—Van Dyke, Gardner, Linn & Burkhart, LLP

(57) ABSTRACT

A method of assembling pallets 14, 20, 28 containing first stock units 50 for use in the fulfillment of stock orders, the method comprising the steps of providing a plurality of first pallets 14 each containing a quantity of the first stock units 50 and moving a portion of the first stock units 50 from at least one of the first pallets 14 onto one or more second pallets 20 in establishing desired quantities of the first stock units 50 in the first and second pallets 14, 20 for use in the fulfillment of the stock orders. In one form, the sequence of order fulfillment is controlled to increase the quantity of first stock units on the first pallets used in fulfilling the stock orders. A distribution system and control system is also disclosed.

16 Claims, 4 Drawing Sheets

FIG. 2

|  | Ordered Cs | (-) Pick | Traditional Pick | Cases Handled |
|---|---|---|---|---|
|  | 297 | 158 | 139 | 181 |
|  | 297 | 180 | 117 | 125 |

Current Method

| Load # | Inventory Pallet | Ordered Cs | (-) Pick | Traditional Pick | Cases Handled |
|---|---|---|---|---|---|
| Load 1 | 100 | 70 | 70 | 0 | 30 |
| Load 2 | 100 | 15 | 0 | 15 | 15 |
| Load 3 | 100 | 25 | 0 | 25 | 25 |
| Load 4 | 100 | 14 | 0 | 14 | 14 |
| Load 5 | 100 | 18 | 0 | 18 | 18 |
| Load 6 | 100 | 20 | 0 | 20 | 20 |
| Load 7 | 100 | 88 | 88 | 0 | 12 |
| Load 8 | 100 | 13 | 0 | 13 | 13 |
| Load 9 | 100 | 12 | 0 | 12 | 12 |
| Load 10 | 100 | 22 | 0 | 22 | 22 |
|  |  | 297 | 158 | 139 | 181 |

Proposed Method

| Load # | Inventory Pallet | Ordered Cs | (-) Pick | Traditional Pick | Cases Handled |
|---|---|---|---|---|---|
| Load 9 | 100 | 12 | 0 | 12 | 12 |
| Load 7 | 88 | 88 | 88 | 0 | 0 |
| Load 3 | 100 | 25 | 0 | 25 | 25 |
| Load 1 | 75 | 70 | 70 | 0 | 5 |
| Load 2 | 105 | 15 | 0 | 15 | 15 |
| Load 4 | 90 | 14 | 0 | 14 | 14 |
| Load 5 | 76 | 18 | 0 | 18 | 18 |
| Load 6 | 58 | 20 | 0 | 20 | 20 |
| Load 8 | 38 | 13 | 0 | 13 | 13 |
| Load 10 | 25 | 22 | 22 | 0 | 3 |
|  |  | 297 | 180 | 117 | 125 |

*FIG. 4*

METHOD AND SYSTEM FOR ASSEMBLING PALLETS FOR STOCK ORDERS

TECHNICAL FIELD

The present invention relates generally to distribution operations and more specifically to a method of assembling pallets containing stock units to fulfil stock orders and to associated systems. The invention has been developed especially, but not exclusively, for the food and beverage market and is herein described in that context. However, it is to be appreciated that the invention is not limited to that use and can be applied to other industries. Further, the term "pallet" is used in a general sense to mean a discrete quantity of stock that is transported as a single unit and is not limited to the arrangement where the stock is located on a pallet tray, but include other arrangements for transporting stock such as crates, boxes and the like.

BACKGROUND

Within most food and beverage markets exists a sector of customers commonly termed the route trade. These are smaller customers, such as corner stores, service stations, restaurants and the like, that order smaller amounts of products on a regular replenishment cycle. Food and beverage manufacturers service these customers with smaller delivery trucks (of up to 14 pallets or less), each truck handling a defined delivery run (route) containing a number of customer drops per route.

The distribution centres service the trucks by assembling pallets of stock units (typically provided in cases) that represent the entire collective orders (or batch) for that particular route, often termed a route load. These pallets typically include a mix of stock units.

Assembly of the mixed stock unit pallets is performed by warehouse picking operators on pallet movers, travelling within the warehouse and building mixed pallets as directed by either a load pick slip or radio frequency commands.

While this type of manual picking methodology is simple and effective, increasingly food and beverage manufacturers are looking for a faster, safer and more efficient means of performing this task.

SUMMARY OF INVENTION

In a first aspect, the present invention provides a method of assembling pallets containing first stock units for use in the fulfillment of stock orders, the method comprising the steps of: providing a plurality of first pallets each containing a quantity of the first stock units; and moving a portion of the first stock units from at least one of the first pallets onto one or more second pallets in establishing desired quantities of the first stock units in the first and second pallets for use in the fulfillment of the stock orders.

In accordance with this method, some of the first stock units are removed from at least one of the first pallets with the remainder being utilised in the assembly of a pallet to fulfil a stock order. As such, these first pallets are provided having first stock units that are normally in excess of that required in a particular order. These first pallets would in most instances be provided as fully loaded pallets but it will be appreciated that this is not essential to the invention. Further, typically the second pallets are provided as empty order pallets and are set up to receive stock units. However again it is to be appreciated that the invention is not limited to such an arrangement as the second pallets may be provided in a partially loaded state.

The method of the invention has substantial benefit in reducing handling of stock units in the assembly of stock unit pallets. It utilises a "negative pick" where the residual stock quantities from the first pallet are used and a "put-to-pallet" system where empty order pallets ("the second pallets") are set up to receive stock units. These processes are combined by having these second pallets receive stock units removed from the first pallets.

Typically the stock unit pallets are assembled as part of a batch order involving a plurality of the pallets. In such an arrangement a plurality of the first pallets is typically used, usually in a sequential order and moreover, at least one of the second pallets may receive the first stock units from more than one first pallet.

In a particular form, the method further includes the step of controlling the sequence of assembly of a plurality of stock unit pallets so as to increase the opportunities to use the first pallets as "negative picks". This is beneficial as the required quantity of first stock units on those pallets do not require handling of the stock units. However, to avoid inefficient handling of the stock, the increase of "negative picks" needs to be achieved without significantly increasing the need to remove stock units from those pallets which are then not used on the second pallets.

In a particular form, the sequence of assembly is controlled by grouping of the orders into subgroups where the first stock units in any group are as close as possible to the quantity of first stock units that are provided on the first pallets.

In one form, the orders are in respect of pallets containing mixed stock and the method further comprises the step of loading at least one second stock unit onto both the first and second pallets to form a plurality of assembled mixed stock unit pallets. Typically the orders are unique and the required quantity of the first and second stock units varies from pallet to pallet.

The assembly method has particular application where the required quantity of the first stock units in an order is substantially greater than the required quantities of any one of the second stock units. For instance, food and beverage manufacturers produce a range of stock keeping units (SKUs) covering many brands, flavours and sizes. However, orders consistently require many cases of the fastest moving SKUs, often at or above an 80/20 volume to SKU profile. In these circumstances, the fast moving SKUs are incorporated as the first stock units of the above described method.

In one form, the method is used in picking operations where the stock units are moved manually. The ability to be able to limit the handling of stock units can substantially improve the efficiency of these operations as it can both reduce the total weight lifted by operators over a given time, whilst at the same time providing an opportunity to increase the total throughput of stock units.

In yet a further aspect, the invention provides a distribution system comprising: a plurality of first pallets each containing a quantity of first stock units; a plurality of second pallets arranged to receive the first stock units; and a control system operative to issue instructions on the transfer of first stock units from the first pallets to the second pallets so as to establish desired quantities of the first stock units in the first and second pallets for use in the fulfillment of stock orders.

The control system may be arranged to issue these instructions in any suitable form. For example the instructions may be issued as a paper pick slip, as voice controls to operators and/or by indicators or the like.

In one form, the control system is arranged to implement the sequence methodology discussed with reference to the earlier aspect of the invention.

In a further aspect, the invention provides a method of controlling the sequence of assembly of a batch of orders for a plurality of pallets containing a desired quantity of a first stock unit; the method comprising the steps of: arranging the stock orders into sub groups where the combined quantity of the first stock units in sub groups is close to a predetermined value; and sequencing the assembly of the pallets based on those sub groups. In one form, the predetermined value is equal to the initial quantity of the first stock units on the first pallets.

In yet a further aspect the invention provides a control system for use in the above methods and distribution system. In a particular form, the control system is embodied in software.

BRIEF DESCRIPTION OF THE DRAWINGS

The attached drawings show an example embodiment of the invention. The particularity of those drawings and the associated description does not supersede the generality of the preceding broad description of the invention.

In the drawings;

FIG. 2 illustrates batched orders over ten route trucks;

FIG. 4 shows comparative results between a conventional method of pallet assembly and a method utilizing the order sequence of FIG. 3.

DETAILED DESCRIPTION OF THE DRAWINGS

Figure 1:
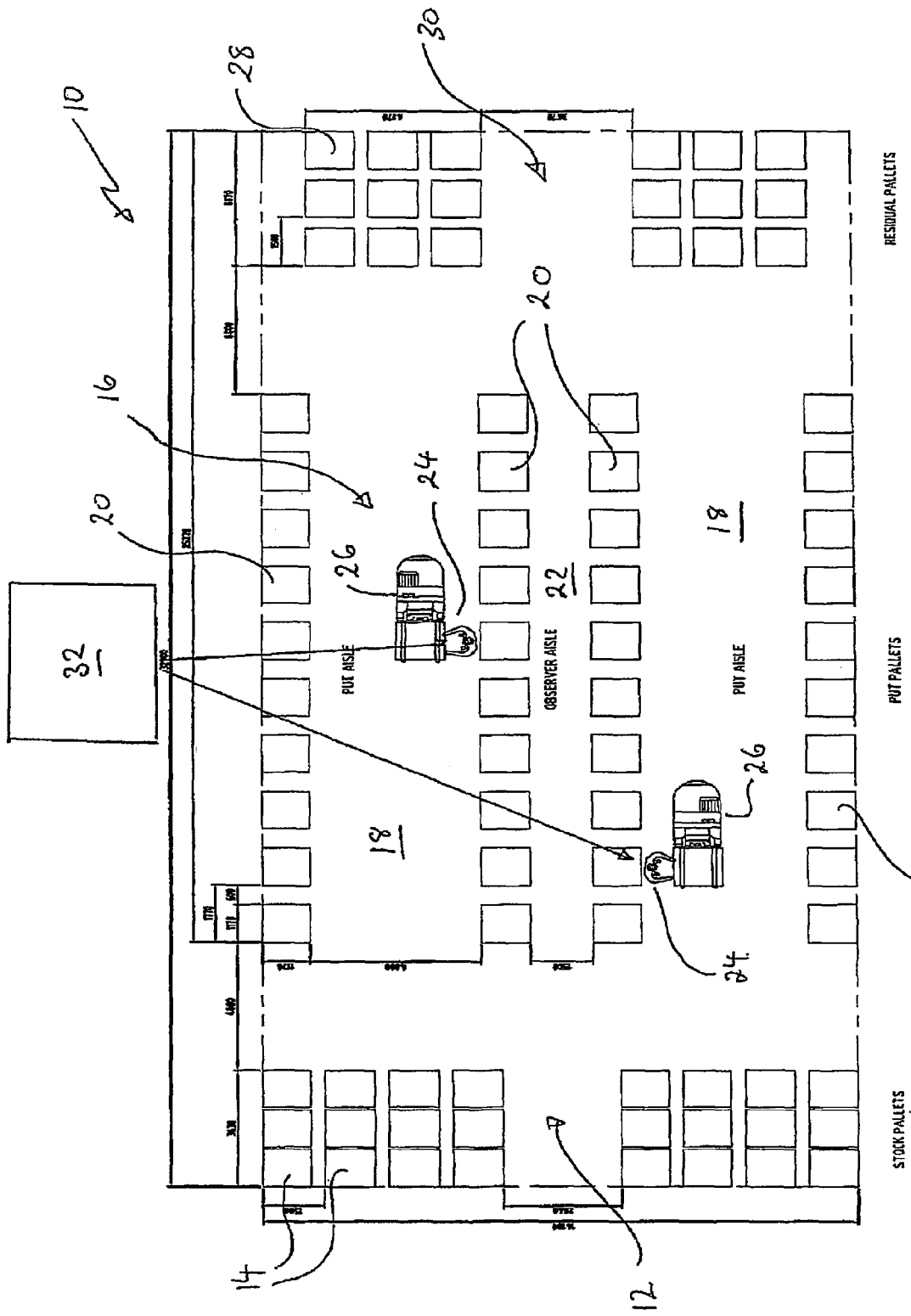
FIG. 1 is a schematic view of a distribution centre for assembling pallets.

Turning firstly to FIG. 1, an assembly area 10 in a distribution centre is illustrated. The assembly area is used specifically for the manual assembling of pallets of a fast moving SKU in response to batched orders as will be explained in more detail below. In the arrangement illustrated, the assembly area 10 is separate from the rest of the warehouse area. As a result, the congestion and replenishment of pallets within the traditional picking areas is much reduced and operator safety greatly improved. However, it is to be appreciated that the assembly area may be more integrated into the remainder of the warehouse if desired.

The assembly area is set out so that a first area 12 contains a plurality of first pallets in the form of fully loaded pallets 14 of the SKUs. These SKUs are typically bundled into units of cases which can be readily lifted manually. An intermediate area 16 of the assembly area contain two outer aisles 18 which are each bounded by two rows of second pallets which are in the form of empty order pallets 20. An observer aisle 22 may be located between the two inner rows of the empty order pallets 20.

Operators 24 work within the area 10 and move the loaded pallets 14 (under suitable handling equipment 26 such as fork lifts) through the aisles 18 and are arranged to off-load quantities of the SKU cases from the loaded pallets 14 onto selected ones of the empty order pallets 20. Once a required quantity of the SKU cases are off-loaded from a loaded pallet 14, that pallet (which is then referred to as a residual pallet 28) is then moved to an end 30 of the area 10.

The batched orders are typically for mixed stock and to load these other SKUs onto the pallets, the residual pallets 28 are typically moved through another part of the warehouse (not shown) along a "pick path" where these other SKUs are picked by an operator in what is commonly referred to as "ride-pick-to pallet" operation. However, it is to be appreciated that other loading techniques may be used as will be appreciated by those skilled in the art.

Similarly, when an empty order pallet 20 has received a desired quantity of the first fast moving SKU cases, it is then also removed from the intermediate area to be transported along the pick path to load up the other SKUs required to complete assembly of the mixed pallet in fulfillment of a stock order.

The pick/putting of the fast moving SKUs in the assembly area 10 onto the first and second pallets (14, 20) are controlled under a control system which in this embodiment is an order management software system 32. This system may provide commands to the operators through various mechanisms, such as voice guided picking/putting or printed pick/put slips, pick light displays etc. The voice guided picking and putting is preferred as it prompts the operator to confirm the SKU location and quantity in real time, thus increasing accuracy and reducing the need to perform checking and QA functions.

The control system 32 is also designed to manage and rearrange the order sequence so as to improve efficiency in the order fulfillment in the assembly area. In particular, the system 32 aims to create the highest quantity of negative pick opportunities. By sequencing and matching the largest quantity orders (of less than full pallet) with one, or more, smaller quantity orders, the most effective number of negative picks can be created. An example of this re-sequencing control process is illustrated with reference to FIGS. 2 to 4.

Figure 2:
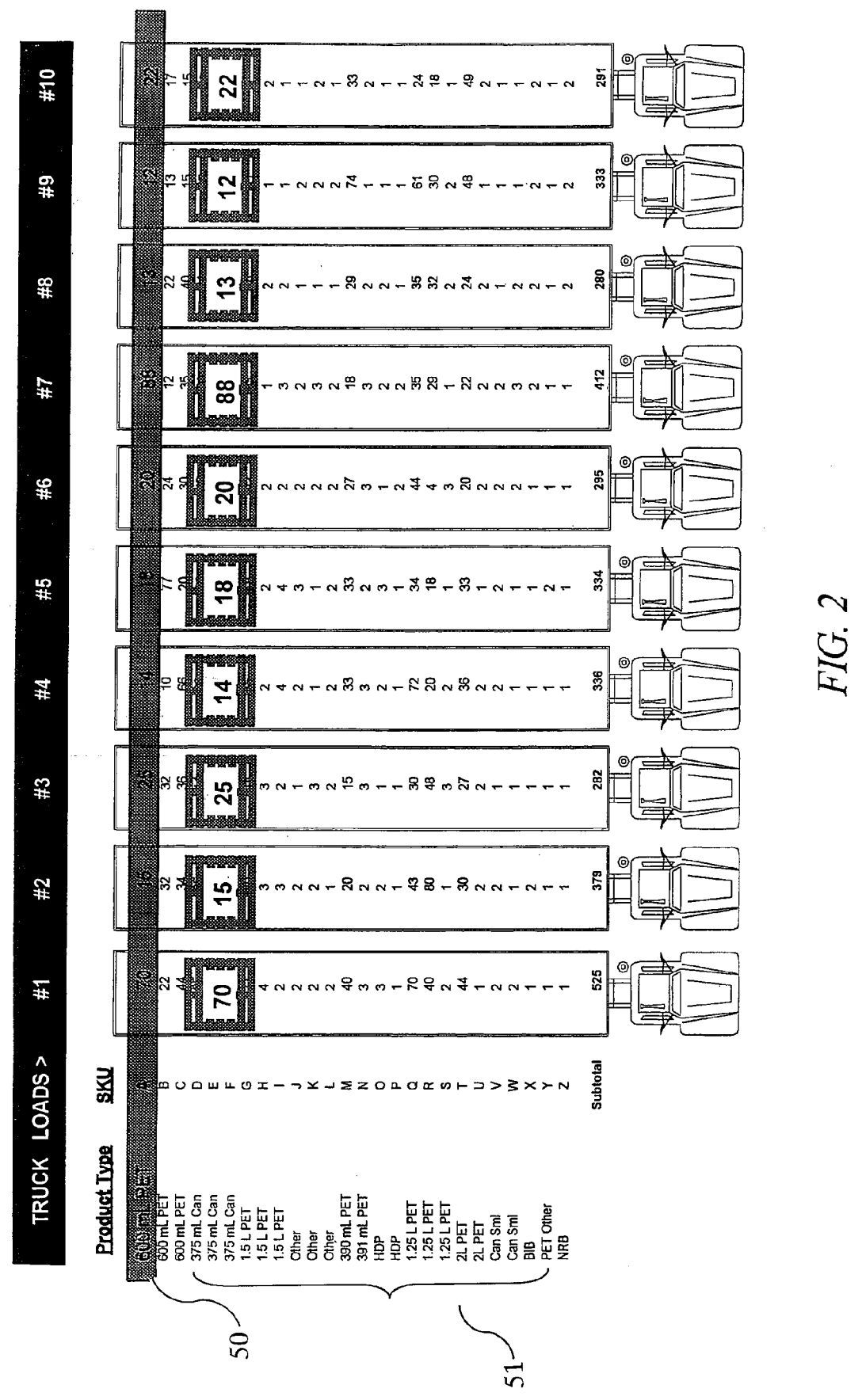

FIG. 2 illustrates batched orders across ten route trucks for mixed pallets. The shaded line highlights the consistency of a single fast moving SKUs 50 across all ten trucks, with the other products 51 listed representing less popular SKUs. The SKUs 50 are arranged to be assembled first onto the pallets in the assembly area 10, whereas the other SKUs 51 are subsequently loaded onto the pallets along the pick path, typically by the "ride-pick-to pallet" operation mentioned above. The sequence of the orders represents an initial sequence of order fulfillment of the mixed pallets based on the truck loads.

Figure 3:
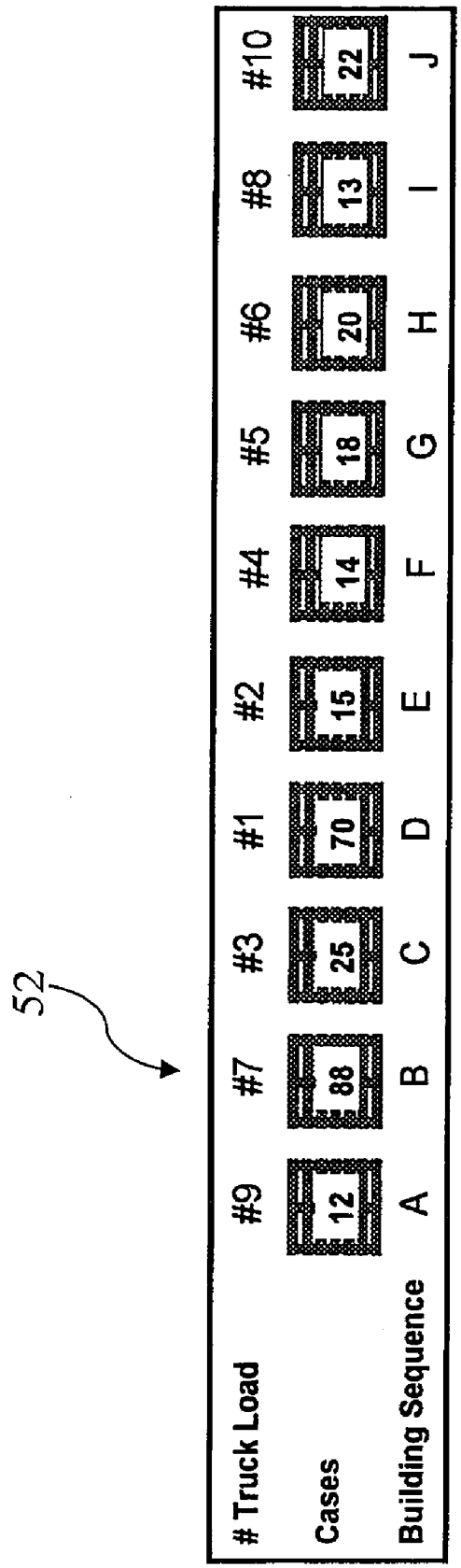
FIG. 3 illustrates an order sequence for assembling the pallets for the orders of FIG. 2.

On receipt of the original batched order, the control system 32 is run and the order is re-sequenced to provide a new fulfillment sequence 52 as illustrated in FIG. 3.

In general, the control system 32 first identifies load pallets qualifying for the assembly area 10 and processes them based upon despatch priority against batch allocation availability. The system 32 then optimises the putting productivity by creating small groups of orders within a batch, where the combined outbound orders are as close to a full SKU pallet as possible. The largest orders complying with the criteria will be first satisfied as negative picks. The following example illustrates the grouping and negative pick priority utilised by the system, for say a 50 case SKU pallet.

1) Pair 2 orders requiring 12 cases and 38 cases (physically handle 12, negative pick 38) and/or,
2) Pair 3 orders requiring 10, 10 and 30 cases (physically handle two puts of 10, negative pick 30) and/or,
3) Pair 4 orders requiring 10, 10, 15 and 15 cases (physically handle two puts of 10, one put of 15, negative pick 15) and/or,
3) Pair 4 orders requiring 20, 20, 20 and 40 cases (physically handle one put of 20, one put of 10, negative pick 20, one put of 10, negative pick 40).

A number of additional rules, such as, time required to route destination, matching order best before dates, etc will also govern the allocation of orders to the assembly order.

Turning back to FIG. 3, this re-sequencing of the orders allows for a more efficient outcome and a greater amount of negative picks to be achieved. This is demonstrated by the comparison chart shown in FIG. 4, which compares the original sequence shown in FIG. 2 and using a conventional "ride-pick-to pallet" operation and the re-sequenced operation shown in FIG. 3 which utilises the assembly area 10 and a combined "negative pick/put" operation. With this arrangement, the opportunities for "negative pick" increased by 14%, the traditional pick operations decreased by 16% which resulted in a 31% decrease in the cases handled.

In traditional ride-pick-to pallet operations, as described previously, the throughput is subject to rate limitations (of around 200-260 cases/hr) due to physical limits of operator and the pick path. The ability of operators to occasionally create negative picks (as shown above) can improve the operator pick rate and reduce the number of cases handled. Previously negative picks have been opportunistic in nature, with more experienced operators identifying negative picks when arriving at the required SKU location. When utilised with ride pick to pallet, rates of around 300-350 cases/hr can be achieved.

The Applicant envisages that utilising the "negative pick/put system" disclosed under operation of a re-sequencing control system to optimise negative pick opportunities, the case handling reduction for a fast moving SKU (complying with order profile and our PUT selection criteria) could be as much as 40%-67%. The effective throughput rates may be in the order of 1200-1715 cases/hr, an improvement of up to 490% over current ride-pick-to-pallet systems.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Variations and alterations may be made to the parts previously described without departing from the spirit or ambit of the invention.

The invention claimed is:

1. A method of assembling pallets containing first and second stock units for use in the fulfillment of stock orders, the method comprising:
   providing a plurality of first pallets each containing a quantity of the first stock units;
   providing a plurality of second pallets arranged to receive the first stock units;
   issuing instructions with a control system on the fulfillment of stock orders;
   moving in response to an instruction from said control system a portion of the first stock units from at least one of the first pallets onto one or more second pallets in establishing desired quantities of the first stock units in the first and second pallets for use in the fulfillment of the stock orders; and
   loading in response to an instruction from said control system at least one second stock unit onto both the first and second pallets to form a plurality of assembled mixed stock unit pallets.

2. A method according to claim 1, further moving a portion of the first stock units from the plurality of the first pallets onto at least one of the second pallets.

3. A method according to claim 1, wherein the control system establishes a desired quantity of the first stock units in the first and second pallets in a predetermined sequence.

4. A method according to claim 3, wherein said control system controls the predetermined sequence to increase the quantity of first stock units on the first pallets used in fulfilling the stock orders.

5. A method according to claim 3, wherein said control system controls the predetermined sequence by arranging the stock orders into sub groups where the combined quantity of the first stock units in the sub groups is close to a predetermined value.

6. A method according to claim 5, wherein the predetermined value is the initial quantity of first stock units on the first pallets.

7. A method according to claim 1, wherein the assembled mixed stock unit pallets each have a required quantity of first and second stock units.

8. A method according to claim 7, wherein the required quantities of first stock units are substantially greater than any one of the required quantities of the at least one second stock units.

9. A method according to claim 1, wherein the first pallets are provided as full pallets.

10. A method according to claim 1, wherein at least one of the second pallet is provided initially in an empty state.

11. A distribution system, comprising:
    a plurality of first pallets each containing a quantity of first stock units;
    a plurality of second pallets arranged to receive the first stock units; and
    a control system operative to issue instructions on the transfer of first stock units from the first pallets to the second pallets so as to establish desired quantities of the first stock units in the first and second pallets for use in the fulfillment of stock orders, wherein said control system issues an instruction to transfer a portion of the first stock units from at least one of the first pallets onto one or more second pallets in establishing desired quantities of the first stock units in the first and second pallets for use in the fulfillment of the stock orders and wherein said control system issues an instruction for loading at least one second stock unit onto both the first and second pallets to form a plurality of assembled mixed stock unit pallets.

12. A distribution system according to claim 11, wherein the control system is arranged to issue instructions by any one or more of paper pick slips, voice commands and/or by indicators.

13. A distribution system according to claim 12, wherein the predetermined sequence is created by arranging the stock orders into sub groups where the combined quantity of the first stock units in the sub groups is close to a predetermined value.

14. A distribution system according to claim 13, wherein the predetermined value is the initial quantity of first stock units on the first pallets.

15. A distribution system according to claim 11, wherein the control system creates a predetermined sequence to establish the desired quantity of the first stock units in the first and second pallets.

16. A distribution system according to claim 11, wherein the predetermined sequence is created to increase the quantity of first stock units on the first pallets used in fulfilling the stock orders.

* * * * *